(12) United States Patent
Bindl et al.

(10) Patent No.: US 10,894,536 B2
(45) Date of Patent: Jan. 19, 2021

(54) SERVICE BRAKE ACTUATION USING A LINEAR ACTUATOR

(71) Applicant: DEERE & COMPANY, Moline, IL (US)

(72) Inventors: Reginald M. Bindl, Dubuque, IA (US); Andrew J. Kindle, Asbury, IA (US); Jeffrey A. Bauer, Dubuque, IA (US); Sean P. West, Dubuque, IA (US); Francois Stander, Dubuque, IA (US); Steven R. Whiteman, Asbury, IA (US)

(73) Assignee: DEERE & COMPANY, Moline, IL (US)

( * ) Notice: Subject to any disclaimer, the term of this patent is extended or adjusted under 35 U.S.C. 154(b) by 134 days.

(21) Appl. No.: 15/986,937

(22) Filed: May 23, 2018

(65) Prior Publication Data

US 2019/0359194 A1 Nov. 28, 2019

(51) Int. Cl.
| | |
|---|---|
| *B60T 13/66* | (2006.01) |
| *B60T 7/04* | (2006.01) |
| *B60T 8/171* | (2006.01) |
| *B60T 13/74* | (2006.01) |
| *B60T 13/14* | (2006.01) |
| *B60T 8/172* | (2006.01) |

(52) U.S. Cl.
CPC ............ *B60T 13/662* (2013.01); *B60T 7/042* (2013.01); *B60T 8/171* (2013.01); *B60T 8/172* (2013.01); *B60T 13/142* (2013.01); *B60T 13/745* (2013.01); *B60T 13/746* (2013.01); *B60T 2220/04* (2013.01)

(58) Field of Classification Search
CPC ........ B60T 13/662; B60T 7/042; B60T 8/348; B60T 8/267; B60T 8/4081; B60T 13/745; B60T 2270/82; B60T 2270/404; F16D 67/02

USPC ................................................ 303/3, 114.1
See application file for complete search history.

(56) References Cited

U.S. PATENT DOCUMENTS 5,102,207 A * 4/1992 Leppek ............... B60T 8/17616
                                                       303/115.2
5,312,172 A * 5/1994 Takeuchi ................ B60T 7/042
                                                       303/113.1

(Continued)

FOREIGN PATENT DOCUMENTS

| DE | 102014214091 A1 | 1/2016 |
| DE | 112016000967 T5 | 12/2017 |
| DE | 102016213994 A1 | 2/2018 |

OTHER PUBLICATIONS

German Search Report issued in Patent Application No. 102019205797.7 dated Jan. 16, 2020 (10 pages).

*Primary Examiner* — Robert A. Siconolfi
*Assistant Examiner* — San M Aung
(74) *Attorney, Agent, or Firm* — Taft Stettinius & Hollister LLP; Stephen F. Rost (57) ABSTRACT

A fluid control system that has a fluid assembly with a piston defined within a chamber, an electrical system having a motor configured to selectively reposition the piston, a controller in communication with the electrical system, and a sensor in communication with the controller to identify a fluid pressure value. Wherein, the controller identifies a desired fluid pressure range and selectively repositions the piston with the motor until the fluid pressure value is within the desired fluid pressure range.

18 Claims, 3 Drawing Sheets

(56) References Cited

U.S. PATENT DOCUMENTS

| | | | |
|---|---|---|---|
| 5,433,514 A * | 7/1995 | Tsukamoto | B60T 8/175 303/113.2 |
| 5,558,409 A * | 9/1996 | Walenty | B60T 7/042 303/10 |
| 9,834,188 B2 | 12/2017 | Feigel | |
| 2007/0188018 A1* | 8/2007 | Reuter | B60T 7/042 303/114.1 |
| 2007/0235278 A1* | 10/2007 | Lubke | F16D 23/12 192/53.2 |
| 2008/0001474 A1* | 1/2008 | Takenouchi | B60T 8/4081 303/119.2 |
| 2011/0175438 A1* | 7/2011 | Mlynarczyk | B60T 13/662 303/20 |
| 2013/0080016 A1* | 3/2013 | Bohn | B60T 13/662 701/78 |
| 2015/0021978 A1* | 1/2015 | Feigel | B60T 8/3655 303/15 |
| 2015/0239438 A1* | 8/2015 | Bohm | B60T 13/686 701/70 |
| 2015/0375726 A1* | 12/2015 | Roll | B60T 8/4827 303/3 |
| 2016/0031426 A1* | 2/2016 | Feigel | B60T 8/4018 303/115.2 |
| 2017/0361825 A1* | 12/2017 | Drumm | B60T 13/745 |

\* cited by examiner

SERVICE BRAKE ACTUATION USING A LINEAR ACTUATOR

FIELD OF THE DISCLOSURE

The present disclosure relates to electro-hydraulic systems and more particularly to applying pressure to an electro-hydraulic system with a linear actuator acting on a piston in a cylinder.

BACKGROUND OF THE DISCLOSURE

Work machines frequently have fluid systems that control various fluid components of the work machine. Often work machines have a brake system that requires a fluid to be supplied to a brake actuating mechanism at a pressure sufficient to properly slow the drivetrain of the work machine. Many work machines utilize a fluid system that has a fluid pump or the like that is driven by a gas or diesel engine. To implement a brake procedure, a brake pedal or other lever mechanically manipulates a valve of the fluid system to provide pressurized fluid from the pump to the brake actuating mechanism to thereby slow the drivetrain of the work machine. In this configuration, the fluid pump is typically engaged as long as the engine is functioning and regardless of the position of the brake pedal.

Other work machines have electro-hydraulic systems wherein the brake procedure is executed by a controller. The brake pedal, lever, or switch has a sensor positioned to identify to the controller when the user engages the brake pedal, lever, or switch. When the controller identifies that the brake system is engaged, the controller sends a signal to a valve of the electro-hydraulic system to provide fluid to the brake actuating mechanism at a pressure that corresponds with the signal sent to the controller from the brake pedal, lever, or switch. In the electro-hydraulic system, the fluid pump is coupled to the engine as described above, and is therefore continuously executing a pumping function as long as the engine is engaged.

The fluid system of typical work machines must have sufficient capacity to apply the brake actuating mechanism even when it is not being engaged by the user. Accordingly, many work machines have parasitic losses generated by the pump when the brake system is not engaged because the pump is generating fluid flow and pressure not needed by the current demands of the work machine.

SUMMARY

One embodiment is a fluid control system having a fluid assembly with a piston defined within a chamber, an electrical system having a motor configured to selectively reposition the piston, a controller in communication with the electrical system, and a sensor fluidly coupled to the fluid assembly to identify a fluid pressure value. Wherein, the controller identifies a desired fluid pressure range and selectively repositions the piston with the motor until the fluid pressure value is within the desired fluid pressure range.

In one example of this embodiment, the motor is coupled to a ball-screw actuator that engages the piston. In one aspect of this example, the ball-screw actuator is rotatable by the motor in an extended direction wherein the piston provides increased pressure to the fluid assembly. In another aspect of this example, the ball screw actuator is rotatable by the motor in a retracted direction, wherein the piston reduces pressure in the fluid assembly when the motor rotates the ball screw actuator in the retracted direction.

In another examples of this embodiment, the fluid assembly includes at least one brake pack, wherein increasing the fluid pressure value increases a braking force applied by the brake pack. One example of this embodiment includes a brake pedal and a position sensor coupled to the brake pedal and in communication with the controller. Wherein, the desired fluid pressure is determined by the controller as a pressure range based on the position of the brake pedal identified by the position sensor. Further wherein, the controller repositions the piston until the pressure sensor identifies a fluid pressure within the pressure range.

In yet another example of this embodiment, the piston maintains a constant position within the chamber when the motor is not provided power.

Another embodiment of the present disclosure is a system for a work machine having a fluid assembly fluidly coupled to the at least one fluid component, a motor selectively engaged by a controller, and a piston repositionable within a cylinder by the motor to selectively alter a fluid pressure applied to the at least one fluid component.

In one example of this embodiment, the fluid assembly includes a reservoir selectively fluidly coupled to the cylinder through a check valve.

In another example of this embodiment, the motor rotates a ball-screw actuator to reposition the piston. In one aspect of this embodiment, the ball-screw actuator has a ball nut assembly positioned around a screw and coupled to the piston with a connecting shaft, wherein when the motor rotates the screw, the ball nut assembly and connecting shaft are linearly displaced to reposition the piston. In yet another aspect of this example, when the motor is not powered, the ball nut assembly and connecting shaft substantially maintain the position of the piston.

Yet another example of this embodiment has a pressure sensor fluidly coupled to the fluid assembly and communicating an active fluid pressure to the controller and a brake switch communicating a brake position to the controller. Wherein, the controller identifies a brake pressure range based on the brake position. Further wherein, the controller repositions the piston with the motor until the pressure sensor identifies the active fluid pressure to be within the brake pressure range. In one aspect of this example, the brake switch identifies the position of a brake pedal and the brake pressure range varies based on the position of the brake pedal.

Another embodiment is a method for providing hydraulic pressure to a brake assembly, including providing a hydraulic assembly having a piston defined within a cylinder, an electrical system having a motor configured to selectively reposition the piston, a controller in communication with the electrical system, a brake system fluidly coupled to the hydraulic assembly, a pressure sensor, and a brake sensor, identifying, with the controller through the brake sensor, a brake command value, establishing a brake pressure range, with the controller, based on the brake command value, monitoring, with the controller through the pressure sensor, an active pressure of the brake system, and altering the position of the piston within the cylinder, with the controller using the motor, until the active pressure is within the brake pressure range.

In one example of this embodiment the motor is coupled to a ball-screw actuator that engages the piston. In one aspect of this example, the ball-screw actuator is rotatable by the motor in an extended direction, wherein the controller rotates the ball screw actuator in the extended direction when the active pressure is less than the brake pressure range. In another aspect of this example, the ball screw actuator is rotatable by the motor in a retracted direction, wherein the controller rotates the ball screw actuator in the retracted direction when the active pressure is greater than the brake pressure range.

In another example of this embodiment, the controller determines the brake command value by utilizing the brake sensor to monitor the position of a brake pedal.

In yet another example of this embodiment, when the active pressure of the brake system is within the brake pressure range, the controller does not power the motor.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
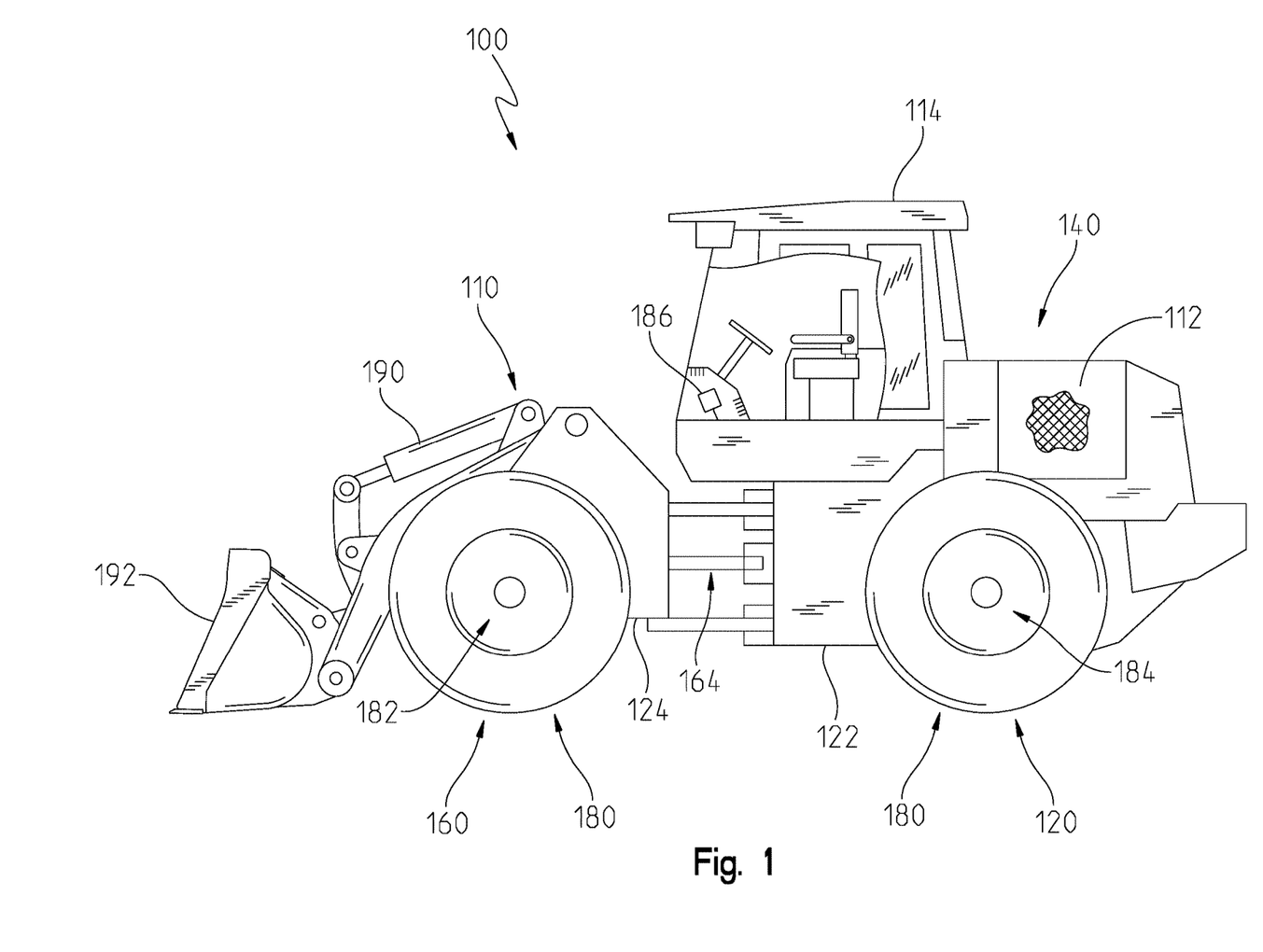
FIG. 1 is a side view of one embodiment of a work machine.

FIG. 1 illustrates an exemplary work machine 100 or vehicle including a front section 110 and a rear section 140. The rear section 140 includes a vehicle engine or motor 112 or other prime mover, an operator cab 114 and a rear axle and wheels 120 coupled to a rear frame 122. The front section 110 includes a front axle and wheels 160 coupled to a front frame 124. The motor 112, front axle and wheels 160, and rear axle and wheels 120 may be a part of a drive system that provides movement to the work machine 100. The drive system may control the available speed and direction of the work machine 100 as is known in the art.

In one aspect of this disclosure, one or more hydraulic cylinder assembly 164 may be coupled to the rear section 140 on one end and to the front section 110 at the other. The hydraulic cylinder assembly 164 may be coupled to a hydraulic system and capable of providing a plurality if linear displacements. More specifically, the hydraulic cylinder assembly 164 may have a cylinder and a rod that is partially positioned within the cylinder. The rod may be coupled to a piston within the cylinder that is repositionable therein. As the piston slides within the cylinder, the rod may similarly be repositioned relative to the cylinder. Accordingly, the rod may be coupled to the rear section 140 and the cylinder may be coupled to the front section 110 or vice versa to provide a steering input to the user.

If the user desires to turn in a first direction, the rod may be orientated in an elongated position relative to the cylinder to pivot the rear section 140 in a first direction about the vertical axis. Alternatively, if the user desires to turn in a second direction, the rod may be oriented in a shortened position relative to the cylinder to pivot the rear section 140 in a second direction relative to the front section 110 about the vertical axis. The second direction may be substantially opposite the first direction.

While a single hydraulic cylinder is described above, a person skilled in the relevant art understands that more than one hydraulic cylinder may be utilized to pivot the sections 140, 110 relative to one another. More specifically, a hydraulic cylinder may be located on either side of the vertical axis to pivot the front section 110 relative to the rear section 140. In this configuration, as one hydraulic assembly is becoming elongated the other hydraulic assembly may be shortened. Accordingly, no particular number of hydraulic assemblies is limiting, and this disclosure considers any number of hydraulic cylinders utilized for steering.

Similarly, other hydraulic actuators may be positioned throughout the work machine 100. In one non-limiting example, a bucket actuator 190 may be coupled between the front section 110 and a bucket linkage. The bucket actuator 190 may be elongated and shortened in a similar way as described above for the hydraulic cylinder assembly 164 to alter the position of a bucket 192. Accordingly, many different hydraulic actuators and other hydraulic components are considered herein as being part of a hydraulic system for a work machine.

A service brake assembly 180 may also be part of the exemplary work machine 100. The brake assembly 180 may include a front brake pack 182 and a rear brake pack 184 positioned to selectively engage the corresponding axles to thereby slow or otherwise alter the velocity of the work machine 100. Further, the brake assembly 180 may have a brake pedal 186 or the like. The brake pedal 186 may send a signal to a controller 202 (see FIG. 2) indicating a braking force desired by the user. In turn, the controller 202 may engage an electro-hydraulic or electro-pneumatic system to engage brake packs 182, 184 and slow the work machine 100.

The brake pedal 186 may have a potentiometer or other position sensor that identifies the distance the brake pedal 186 has been offset from a neutral position. In one nonexclusive example, the offset of the brake pedal 186 may be measured as an offset angle. The controller 202 may transmit a corresponding signal to the electro-hydraulic or electro-pneumatic system to engage the brake packs 182, 184 with a pressure that corresponds with the position of the brake pedal 186. While the brake pedal 186 is specifically shown and described herein, the brake assembly 180 can use any known system for sending a braking command to the controller 202 to engage the brake packs 182, 184. In other embodiments, one or more joysticks may be monitored by the controller 202 to identify when a braking function should be applied with the brake packs 182, 184. Alternatively, a parking brake switch or the like may be monitored by the controller 202 to identify when the brake packs 182, 184 should be engaged. Accordingly, this disclosure considers any known method of identifying when a braking function is desired by a user.

While the brake packs 182, 184 are described herein as engaging the front and rear axles 160, 120, other locations for the brake packs 182, 184 are also considered as part of this disclosure. More specifically, the brake packs may be a caliper and rotor configuration positioned in each wheel of the work machine 100. Further still, the brake packs 182, 184 may be positioned in the transmission or along the driveshaft to thereby slow the drivetrain of the work machine 100. Accordingly, this disclosure applies to any system that has a hydraulic, pneumatic, or other fluidly engaged brake as part of a drivetrain.

While a particular work machine 100 is shown herein to illustrate a hydraulic system, this disclosure is considered for other types of work machines as well. More specifically, this disclosure applies at least to any type of work machine that utilizes a fluid system that selectively requires fluid to be provided at a pressure to a fluid component. Accordingly, this disclosure considers applications other than the work machine 100 illustrated herein. For example, this disclosure is also applicable in at least automobiles, tractor-trailer assemblies, agricultural machines, recreational vehicles, construction machines, forestry machines and removable trailers to name a few additional applications.

Further still, the teachings of this disclosure apply to any type of fluid system that requires a fluid to be supplied to a fluid component in a pressurized state. More specifically, these teachings are applicable in pneumatic brake systems, hydraulic brake systems, hydraulic clutch systems, hydraulic actuator systems, and the like. While one particular embodiment of the present disclosure is shown herein as utilizing these teachings to apply brakes of the brake packs 182, 184, this disclosure also considers implementing these teachings for other applications as well.

Figure 2:
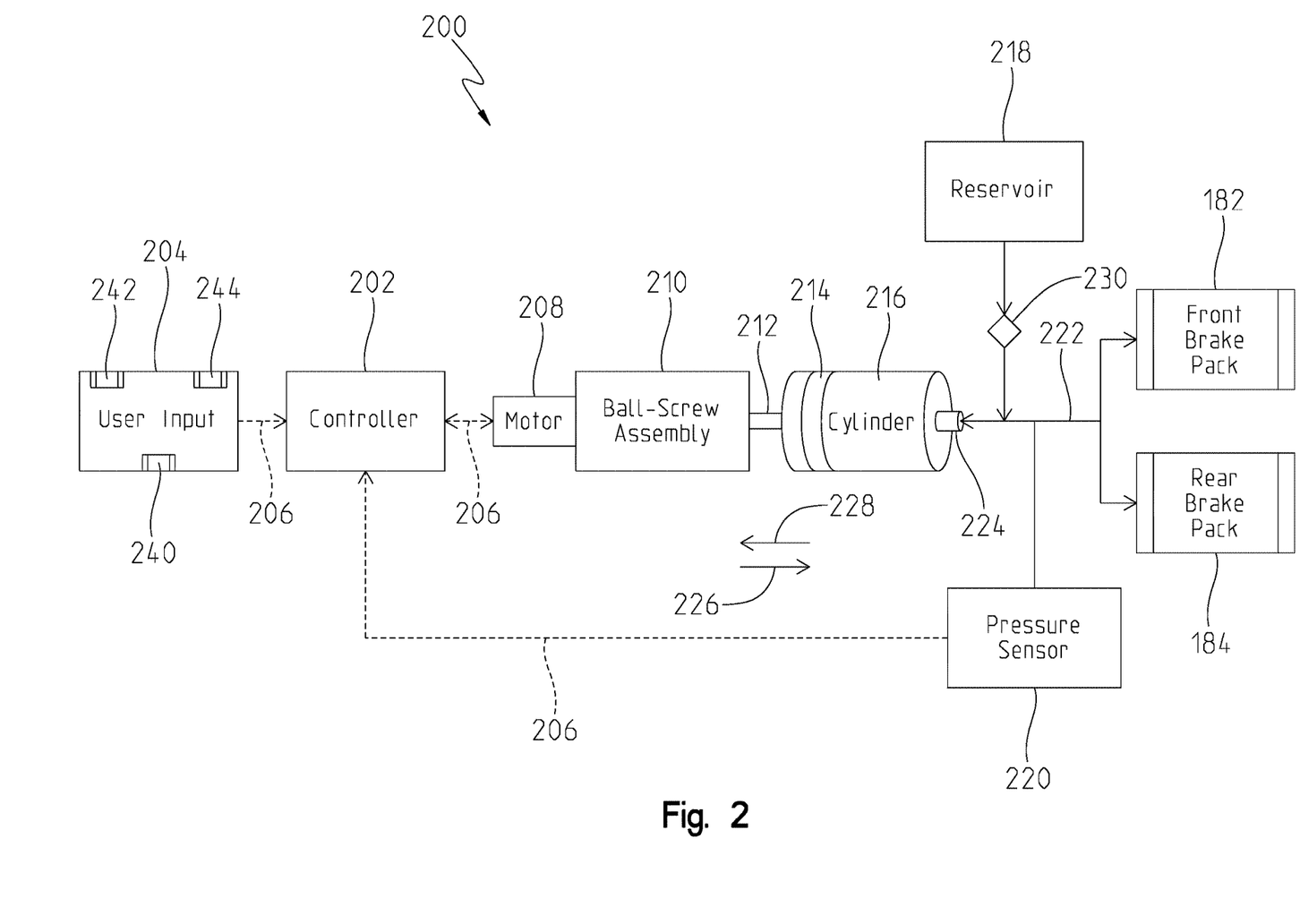
FIG. 2 is an illustrative view of a control system for the work machine of FIG. 1.

Referring now to FIG. 2, a diagrammatical view of a control system 200 is illustrated. The control system 200 may utilize one or more controller 202 to communicate with and direct other components of the control system 200. The controller 202 may have a memory unit configured to store executable programs, threshold values, ranges, control algorithms, lookup tables, and the like and one or more processor capable of executing commands and the like. The controller 202 may take any form known in the art, and the memory unit and processor may be stored in separate locations. Further still, the entire controller 202 may be located remotely from the work machine 100. Accordingly, the physical configuration, number, and location of the controller 202 is not meant to be limiting, and this disclosure considers any location and form of controller 202 known in the art.

A user input 204 may communicate with the controller 202 to identify a user preference. In the exemplary work machine 100 described above, the user input 204 may be a signal sent to the controller 202 from the brake pedal 186. More specifically, the brake pedal 186 may be coupled to a sensor 240 that identifies the position of the brake pedal 186 to thereby direct the controller 202 to apply a corresponding amount of pressure to the brake packs 182, 184. However, this disclosure also considers embodiments where the user input 204 can be from other sources as well. For example, a toggle switch may communicate the user input 204 to the controller 202. The toggle switch may be utilized for parking brake type functions where the user desires for the brakes to remain engaged. Similarly, the user input 204 may be a touchscreen 242 or the like where the user identifies a brake apply request via the touchscreen. Further, the user interface could be a joystick 244 or other control mechanism. Accordingly, this disclosure considers many different methods for generating the user input 204.

The user input 204 may communicate with the controller 202 using a communication protocol 206. The communication protocol 206 can be any communication protocol known in the related arts. More specifically, the communication protocol 206 may be a hardwired electronic communication protocol such as a Controller Area Network ("CAN") and part of a CAN bus. Further, the communication protocol 206 may be any wireless communication protocol known in the art such as radio frequencies, infrared, satellite, and the like systems. Accordingly, this disclosure contemplates any form of wired or wireless communication between the user input 204 and the controller 202.

The control system 200 may also have a motor 208 coupled to a ball-screw assembly 210. Further, the ball-screw assembly 210 may be selectively engaged by the motor 208 to linearly displace a shaft 212 coupled to a piston 214 within a cylinder 216. The cylinder 216 may have an orifice 224 fluidly coupled to the brake packs 182, 184, a reservoir 218, and a pressure sensor 220 with one or more fluid passages 222. In this embodiment, the motor 208 may engage the ball-screw assembly 210 to reposition the piston 214 within the cylinder 216 in an extended direction 226 or a retracted direction 228. As the piston 214 is moved in the extended direction 226, at least some fluid contained in the cylinder 216 may be forced out of the orifice 224 and into the fluid passages 222. Accordingly, as the piston 214 moves in the extended direction 226, fluid flow and pressure may be provided to the brake packs 182, 184, to apply a corresponding braking force to the work machine 100.

Similarly, the motor 208 may engage the ball-screw assembly 210 to move the shaft 212 and piston in the retracted direction 228. When the piston moves in the retracted direction 228, at least some fluid may be removed from the brake packs 182, 184. Additional fluid may be stored in the reservoir 218 and enter the fluid passages 222 or the cylinder 216 as the piston 214 is moved in the retracted direction 228. In one aspect of this disclosure, the reservoir 218 may be fluidly coupled to the fluid passages 222 through a check valve 230 or the like fluid valve. The check valve 230 may restrict fluid from entering the reservoir 218 as the piston 214 moves in the extended direction 226 but allow fluid to pass from the reservoir 218 into the fluid passages 222 when the piston is moved in the retracted direction 228.

In one aspect of this disclosure, the reservoir 218 may provide fluid to the fluid passages 222 and cylinder 216 in situations where fluid has escaped the system or as the brake packs 182, 184 require additional fluid to properly apply. Accordingly, as the piston 214 moves in the retracted direction 228, at least some fluid may be redirected into the cylinder 216 as the fluid pressure on the brake packs 182, 184 is released. However, the piston 214 may introduce a vacuum pressure as the piston moves in the retracted direction 228. The vacuum pressure may be addressed by opening the check valve 230 and allowing fluid within the reservoir 218 to enter the fluid passages 222 and the cylinder 216 as needed.

This disclosure considers utilizing both hydraulic and pneumatic systems, wherein the term "fluid" includes both liquid fluids and gaseous fluids. Accordingly, the piston 214, cylinder 216, fluid passages 222, reservoir 218, and brake packs 182, 184 may be configured to work as part of either a pneumatic system or a hydraulic system. Accordingly, this disclosure considers applying the teachings disclosed herein utilizing many different fluid states.

Figure 3:
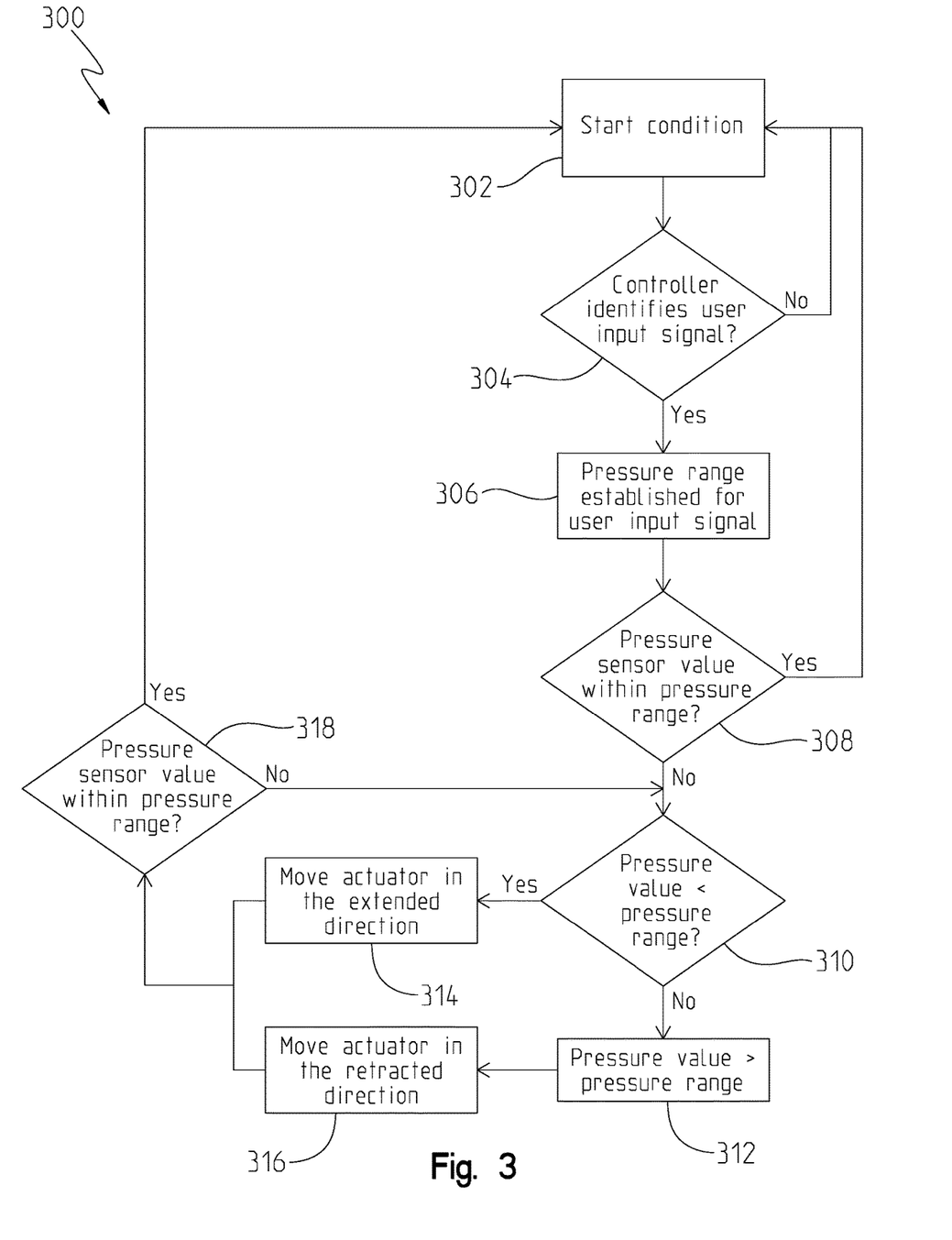
FIG. 3 is an illustrative view of a logic flow chart of the present disclosure.

Referring now to FIG. 3, one non-exclusive embodiment of a logic flowchart 300 of the present disclosure is illustrated. The first criteria identified by the controller 202 is whether a start condition has been initiated in box 302. The start condition may be identified by monitoring any component of the work machine 100. In one example, the start condition may be related to an ignition switch. However, the start condition may also be related to other measured values of the work machine such as vehicle speed, engine speed, inputs on the user input 204, or any other identifiable input.

Regardless of the source, the controller 202 may utilize the start condition to identify when remaining portions of the logic flowchart 300 should be executed.

If the controller 202 identifies that the start condition is present, for example when the ignition of the work machine 100 is engaged or the like, the controller 202 may begin monitoring the user input signal in box 304. In box 304, the controller 202 may monitor the user input 204 to determine if a braking sequence or other fluid pressure operation is requested by the user. If a user input signal is not identified by the controller 202 in box 304, the controller 202 may substantially continuously identify whether the start condition is present in box 302 and monitor the user input signal in box 304.

If a user input signal is identified in box 304, for example when a user depresses the brake pedal 186, the controller 202 may establish a pressure range in box 306 that corresponds with the user input signal. In one non-exclusive example, the controller 202 may have a lookup table, graph, algorithm, or the like that is stored in the memory unit and utilized by the controller 202 to associate a pressure with the corresponding user input signal. More specifically, in the brake pedal example, the controller 202 may identify movement of the brake pedal 186 between an unapplied position and a fully applied position.

In another embodiment, the user input identified in box 304 may be a parking brake switch or other similar user input. In this configuration, the controller 202 may have a predefined minimum pressure value stored therein to implement the parking brake function. Accordingly, in the parking brake switch embodiment the user input in box 304 is a parking brake switch and the pressure value range is a minimum threshold value.

The user input considered in box 304 may be any of; a position sensor coupled to a pedal, a switch for a parking brake, a clutch engagement switch for a Power Take-Off ("PTO") or other transmission clutch, or any other device used to identify that an increased fluid pressure is needed by a fluid system. While a user input is specifically described in box 304, this box may not be input by a user at all. Rather, this disclosure also considers embodiments where the input from box 304 is generated by the work machine itself rather than directly by the user. More specifically, box 304 may have the controller 202 interpreting signals from a transmission controller or the like as part of box 304.

In one non-exclusive example, the hydraulic system may have an available pressure that can be generated by the motor 208, piston 214, and cylinder 216. The available pressure is the fluid pressure applied to the brake packs 182, 184 when the motor 208, piston 214, and cylinder 216 are operating at full capacity. In establishing the proper pressure range in box 306, the unapplied position may correspond with 0% of the available pressure and the fully applied position may correspond with 100% the available pressure. In this scenario, the controller 202 may select a different pressure range as a percentage of the available pressure based on the angular position of the brake pedal 186. The pressure range being anywhere between 0% the available pressure when the brake pedal is unapplied and 100% the available pressure when the brake pedal 186 is fully applied.

As described above, the pressure range identified in box 306 may be established utilizing other methods as well. In one embodiment, the pressure range is identified as part of an algorithm that incorporates values from the user input 204. In another embodiment, the pressure range may be a preset range that is implemented whenever a user input signal is identified. Accordingly, this disclosure considers many different methods for establishing the pressure range in box 306.

The pressure range established in box 306 may be compared to a pressure sensor value in box 308. The pressure sensor value may be identified by the controller 202 through communication with the pressure sensor 220. More specifically, the pressure sensor 220 may send a signal to the controller 202 identifying the fluid pressure in the fluid passages 222 or the like and being applied to the front and rear brake packs 182, 184. If the controller 202 determines that the pressure sensor value is within the pressure range established in box 306, the controller may return to box 302 and continue to monitor for the start condition of box 302, the user input signal of box 304, and the pressure sensor value of box 308.

However, if the pressure sensor value is not within the range in box 308, the controller 202 may determine whether the pressure sensor value is less than or greater than the pressure range in boxes 310, 312. In box 310, the controller 202 checks if the pressure sensor value is less than the pressure range. If the pressure sensor value is less than the pressure range in box 310, the controller 202 may execute box 314, wherein the controller 202 moves the ball-screw assembly 210 in the extended direction 226 to thereby move the piston 214 in the extended direction 226 to increase the fluid pressure applied to the brake packs 182, 184. The controller 202 may monitor the pressure sensor value in box 318 to determine whether the pressure sensor value is within the pressure range. In one non-exclusive example, the controller 202 may substantially simultaneously execute box 318, box 310, and box 314 until the pressure sensor value is within the pressure range in box 318.

In other words, if the controller 202 identifies that the pressure value is less than the pressure range in box 310, the controller 202 may activate the motor 208 to engage the ball-screw assembly 210. In turn, the ball-screw assembly 210 may move the piston 214 in the extended direction 226 to increase the fluid pressure applied to the front and rear brake packs 182, 184 until the pressure value is within the pressure range. In short, the controller 202 continues to increase the fluid pressure with the motor 208 until it reaches the pressure range.

The controller 202 may execute box 312 when the pressure value is greater than the pressure range. In one non-exclusive example, box 312 may be executed when the brake pedal 186 is manipulated towards the neutral position thereby indicating the user wants a reduced braking force for the work machine 100. In this scenario, the controller 202 may utilize the motor 208 to move the ball-screw assembly 210 in the retracted direction 228 to thereby reduce the fluid pressure applied to the brake packs 182, 184 in box 316. The controller 202 may then utilize the pressure sensor 220 in box 318 to determine if the pressure value is within the pressure range established in box 306. The controller 202 may execute box 312, box 316, and box 318 until the pressure sensor value is within the pressure value range in box 318.

Once the pressure sensor value is within the pressure range in box 318, the controller 202 may continue to execute the logic flowchart 300 with any appropriate frequency. Further, while the particular boxes are shown sequenced in a specific order, this is meant to be exemplary only and other orders of execution are also considered herein. More specifically, boxes 310 and 312 may be switched or executed simultaneously. Further still, in another embodiment when the pressure sensor value is not within the pressure range of box 318, the controller may execute box 304 before further adjusting the ball-screw assembly 210. Other embodiments don't have a start condition box 302 at all but rather continuously monitor for a user input. Accordingly, the embodiment shown and described herein is meant as example only and is not exclusive.

In one aspect of the present disclosure, the ball-screw assembly 210 may have a ball nut assembly positioned around a screw and coupled to the piston 214 with the shaft 212. In this configuration, when the motor 208 engages the components of the ball nut assembly the shaft 212 is linearly displaced to reposition the piston 214.

Further, the ball-screw assembly 210 may substantially lock the piston 214 in position when the motor 208 is not powered. In this configuration, when the controller 202 identifies that the pressure sensor value is within the pressure range in either box 308 or box 318, the controller 202 may execute a command to discontinue providing any power to the motor 208. The ball-screw assembly 210 may have a mechanical braking system positioned therein. The mechanical braking system may substantially lock the shaft 212 of the ball-screw assembly 210 when the motor 208 is not powered. Accordingly, the linear position of the shaft 212, and in turn the piston 214, is substantially maintained when power to the motor 208 is discontinued. In other words, the pressure in the fluid system is substantially maintained when the motor 208 is not powered.

One aspect of this embodiment is the potential mounting configurations available to the fluid system. More specifically, the motor 208, ball-screw assembly 210, cylinder 216 and components associated therewith may be located in close proximity to the brake packs 182, 184. This may limit the length of fluid passages 222 in the work machine 100. Further, one embodiment may position the motor 208, ball-screw assembly 210, cylinder 216 and other components within a portion of the axle 120, 160 proximate to the corresponding brake pack 182, 184. This configuration would allow an axle sub-assembly to be constructed with the motor 208, ball-screw assembly 210, cylinder 216 and other components installed in the axle. Accordingly, installing the axle sub-assembly to the work machine 100 would require only an electrical connection to the motor 208 to provide a working brake system.

In another embodiment of the present disclosure, the pressure sensor 220 may be replaced with a motor sensor. The motor sensor may be in communication with the controller 202 to identify a corresponding load on the motor 208. Further, the controller 202 may have a table, graph, algorithm, or the like stored therein that associates the load on the motor 208 with a fluid pressure provided to the brake packs 182, 184, or other fluid component. Accordingly, in this embodiment boxes 308 and 318 may use the motor sensor instead of the pressure sensor 220 to identify a pressure value to be compared to the pressure range. In one non-exclusive example, the motor sensor may measure the current draw of the motor 208; however, any other electrical property of the motor 208 may be monitored as well.

While this system has primarily been described with reference to engaging one or more brake pack, also considered herein is applying a fluid pressure to engage a clutch system. This embodiment is substantially the same as the system described above for the brake packs 182, 184 except the fluid passages 222 may couple to the clutch system instead of the brake packs 182, 184. The clutch system may be part of a transmission or utilized to selectively engage a power take-off ("PTO"). Accordingly, the brake packs 182, 184, may also be clutch assemblies.

Further still, in one aspect of this disclosure the controller 202 may establish a force profile for applying the corresponding clutch system. In this configuration, when the controller 202 identifies a user input 204 indicating clutch engagement, the controller 202 may apply fluid pressure to the clutch based on a predefined force profile. The force profile may be a fluid pressure applied over a preset time. Further, the force profile may be applied by the motor 208 engaging the ball-screw assembly 210 to move the piston 214 in the extended direction 226 to apply fluid pressure to the clutch system based on the force profile.

While this disclosure has been described primarily with reference to applying fluid pressure to hydraulic brake packs 182, 184, pneumatic brake systems are considered as well. More specifically, a trailer assembly may be coupled to a vehicle or the like. The vehicle may be electrically coupled to the trailer to communicate a brake command thereto. In this configuration, the controller 202 may receive the brake command from the vehicle and engage the motor 208 to apply the ball-screw assembly 210 in the extended direction 226 to thereby provide increased pneumatic pressure in the fluid passages 222. This increased pneumatic pressure may apply one or more pneumatic brakes of the trailer.

Alternatively, the trailer brake system may be oriented in the apply position when insufficient pneumatic pressure is provide thereto. In this configuration, the controller 202 may maintain a pneumatic pressure in the fluid passages 222 with the piston 214 and cylinder 216 to maintain the pneumatic brakes in a disengaged position until a brake command is identified. Once a brake command is identified, the controller 202 may move the piston 214 in the retracted direction 228 to thereby reduce the fluid pressure applied to the pneumatic brake. The fluid pressure may be sufficiently reduced to allow the pneumatic brake to become oriented in the apply position to provide a braking force on the trailer.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this pertains and which fall within the limits of the appended claims

The invention claimed is:
1. A fluid control system, comprising:
   a fluid assembly having a piston defined within a chamber and at least one clutch assembly;
   an electrical system having a motor configured to selectively reposition the piston;
   a controller in communication with the electrical system; and
   a sensor in communication with the controller to identify a fluid pressure value;
   wherein, the controller identifies a desired fluid pressure range and selectively repositions the piston with the motor until the fluid pressure value is within the desired fluid pressure range;
   further wherein, the position of the piston and the pressure of the fluid assembly is maintained when the electrical system is not powered;
   further wherein, increasing the fluid pressure value increases an apply force applied by the at least one clutch assembly and the at least one clutch assembly selectively engages a power take-off based on a predefined force profile for engaging the at least one clutch assembly.

2. The fluid control system of claim 1, further wherein the motor is coupled to a ball-screw actuator that engages the piston.

3. The fluid control system of claim 2, further wherein the ball-screw actuator is rotatable by the motor in a first direction wherein the piston provides increased pressure to the fluid assembly.

4. The fluid control system of claim 3, further wherein the ball screw actuator is rotatable by the motor in a second direction, wherein the piston reduces pressure in the fluid assembly when the motor rotates the ball screw actuator in the second direction.

5. A system for a work machine, comprising:
a fluid assembly fluidly coupled to at least one fluid component;
a motor selectively engaged by a controller; and
a piston repositionable within a cylinder by the motor as the primary pressure producing mechanism of the fluid assembly to selectively alter a fluid pressure applied to the at least one fluid component;
wherein, the at least one fluid component comprises a brake pack and the motor, piston, and cylinder are positioned at least partially within a portion of an axle sub-assembly of the work machine to selectively apply a braking force to a corresponding wheel.

6. The system of claim 5, further wherein the motor engages a ball-screw actuator to reposition the piston.

7. The system of claim 6, further wherein the ball-screw actuator has a ball nut assembly positioned around a screw and coupled to the piston with a connecting shaft, wherein the motor engages the ball nut assembly to reposition the piston by linearly displacing the connecting shaft.

8. The system of claim 6, further wherein when the motor is not powered, the ball nut assembly and connecting shaft substantially maintain the position of the piston.

9. The system of claim 5, further comprising:
a pressure sensor fluidly coupled to the fluid assembly and communicating an active fluid pressure to the controller; and
a brake input communicating a brake command to the controller;
wherein, the controller identifies a brake pressure range based on the brake command;
further wherein, the controller repositions the piston with the motor until the pressure sensor identifies the active fluid pressure to be within the brake pressure range.

10. The system of claim 9, further wherein the brake input includes a position sensor that identifies the position of a brake pedal and the brake pressure range varies based on the position of the brake pedal.

11. The system of claim 5, further wherein increasing the fluid pressure increases a braking force applied by the brake pack.

12. The system of claim 11, further comprising:
a brake pedal; and
a position sensor coupled to the brake pedal and in communication with the controller;
wherein, a desired fluid pressure is determined by the controller as a pressure range based on the position of the brake pedal identified by the position sensor;
further wherein, the controller repositions the piston until the controller identifies a fluid pressure within the pressure range.

13. A method for providing hydraulic pressure to a brake assembly, comprising:
providing a hydraulic assembly having a piston defined within a cylinder, an electrical system having a motor configured to selectively reposition the piston, a controller in communication with the electrical system, a brake system fluidly coupled to the hydraulic assembly, a pressure sensor, and a user input in communication with the controller to selectively apply a parking brake;
identifying, with the controller through the user input, a parking brake command;
establishing a brake pressure range, with the controller, based on the parking brake command;
monitoring, with the controller through the pressure sensor, an active pressure of the brake system;
altering the position of the piston within the cylinder, with the controller using the motor, until the active pressure is within the brake pressure range; and
maintaining the active pressure when the electrical system is not powered.

14. The method of claim 13, further wherein the motor is coupled to a ball-screw actuator that engages the piston.

15. The method of claim 14, further wherein the ball-screw actuator is rotatable by the motor in a first direction, wherein the controller rotates the ball screw actuator in the first direction when the active pressure is less than the brake pressure range.

16. The method of claim 14, further wherein the ball screw actuator is rotatable by the motor in a second direction, wherein the controller rotates the ball screw actuator in the second direction when the active pressure is greater than the brake pressure range.

17. The method of claim 13, further wherein when the active pressure of the brake system is within the brake pressure range, the controller does not power the motor.

18. The method of claim 13, further wherein the user input is a touchscreen.

* * * * *